US011836612B2

(12) United States Patent
Alda et al.

(10) Patent No.: US 11,836,612 B2
(45) Date of Patent: Dec. 5, 2023

(54) MAINTAINING MASTER DATA USING HIERARCHICAL CLASSIFICATION

(71) Applicant: SAP SE, Walldorf (DE)

(72) Inventors: Francesco Alda, Wiesloch (DE); Evgeny Arnautov, Stutensee (DE); Amrit Raj, Leimen (DE); Sergey Smirnov, Heidelberg (DE); Ekaterina Sutter, Wiesloch-Schatthausen (DE)

(73) Assignee: SAP SE, Walldorf (DE)

( * ) Notice: Subject to any disclaimer, the term of this patent is extended or adjusted under 35 U.S.C. 154(b) by 992 days.

(21) Appl. No.: 16/444,222

(22) Filed: Jun. 18, 2019

(65) Prior Publication Data

US 2020/0401877 A1 Dec. 24, 2020

(51) Int. Cl.

| | |
|---|---|
| ***G06N 3/00*** | (2023.01) |
| ***G06N 3/08*** | (2023.01) |
| ***G06F 16/28*** | (2019.01) |
| ***G06F 16/25*** | (2019.01) |

(52) U.S. Cl.

CPC ............ *G06N 3/08* (2013.01); *G06F 16/258* (2019.01); *G06F 16/285* (2019.01)

(58) Field of Classification Search

None

See application file for complete search history.

(56) References Cited

U.S. PATENT DOCUMENTS

| | | | | |
|---|---|---|---|---|
| 7,181,438 | B1 * | 2/2007 | Szabo | G06Q 30/0212 705/14.27 |
| 7,480,640 | B1 * | 1/2009 | Elad | G06Q 10/10 706/14 |
| 7,483,871 | B2 * | 1/2009 | Herz | H04N 21/4332 |
| 8,639,625 | B1 * | 1/2014 | Ginter | H04N 21/4405 705/50 |
| 9,202,178 | B2 * | 12/2015 | Hall | G06F 17/18 |
| 9,367,610 | B2 * | 6/2016 | Damodaran | G06F 16/367 |
| 9,367,814 | B1 * | 6/2016 | Lewis | G06F 16/353 |

(Continued)

OTHER PUBLICATIONS

Codd, E.F., "A Relational Model of Data for Large Shared Data Banks," Commun. ACM 13(6), pp. 377-387, 1970.

(Continued)

*Primary Examiner* — Farhan M Syed

(74) *Attorney, Agent, or Firm* — Sterne, Kessler, Goldstein & Fox P.L.L.C.

(57) ABSTRACT

Disclosed herein are system, method, and computer program product embodiments for classifying data objects using machine learning. In an embodiment, an artificial neural network may be trained to identify explained variable values corresponding to data object attributes. For example, the explained variables may be a category and a subcategory with the subcategory having a hierarchical relationship to the category. The artificial neural network may then receive a data record having one or more attribute values. The neural network may then identify a first and second explained variable value corresponding to the one or more attribute values based on the trained neural network model. The first and second explained variable values may then be associated with the data record. For example, if the data record is stored in a database, the record may be updated to include the first and second explained variable values.

20 Claims, 7 Drawing Sheets

(56) References Cited

U.S. PATENT DOCUMENTS

| | | | | |
|---|---|---|---|---|
| 9,704,130 | B2 * | 7/2017 | Coldicott | G06Q 10/10 |
| 9,928,448 | B1 * | 3/2018 | Merler | G06F 18/2415 |
| 9,946,783 | B1 * | 4/2018 | Lewis | G06F 16/93 |
| 10,102,454 | B2 * | 10/2018 | Merler | H05K 999/99 |
| 10,366,109 | B2 * | 7/2019 | Maruhashi | G06F 16/285 |
| 10,664,889 | B2 * | 5/2020 | Hueter | G06Q 30/0255 |
| 2003/0233350 | A1 * | 12/2003 | Dedhia | G06F 16/35 |
| 2008/0120129 | A1 * | 5/2008 | Seubert | G06Q 40/125 705/305 |
| 2010/0299294 | A1 * | 11/2010 | Mott | G06F 16/285 707/E17.046 |
| 2011/0099139 | A1 * | 4/2011 | Coldicott | G06Q 10/10 706/47 |
| 2011/0320455 | A1 * | 12/2011 | Jonas | G06F 16/285 707/E17.089 |
| 2012/0215791 | A1 * | 8/2012 | Malik | G06F 40/30 707/E17.084 |
| 2015/0199424 | A1 * | 7/2015 | Damodaran | G06F 16/367 707/756 |
| 2015/0349115 | A1 * | 12/2015 | Tega | H01L 21/047 257/77 |
| 2015/0379115 | A1 * | 12/2015 | Garera | G06F 16/285 705/28 |
| 2015/0379430 | A1 * | 12/2015 | Dirac | G06N 20/00 706/12 |
| 2017/0344617 | A1 * | 11/2017 | Sen | G06F 16/313 |
| 2018/0089540 | A1 * | 3/2018 | Merler | G06V 10/454 |
| 2018/0089543 | A1 * | 3/2018 | Merler | G06V 10/764 |
| 2018/0204111 | A1 * | 7/2018 | Zadeh | G06V 10/764 |
| 2019/0026964 | A1 * | 1/2019 | Papa | G06V 30/40 |
| 2019/0138609 | A1 * | 5/2019 | Taleghani | G06F 16/148 |
| 2019/0138946 | A1 * | 5/2019 | Asher | G06N 5/04 |
| 2020/0026916 | A1 * | 1/2020 | Wood | G06V 30/414 |
| 2020/0410729 | A1 * | 12/2020 | Zhao | G06F 8/34 |
| 2021/0406780 | A1 * | 12/2021 | Lesner | G06F 18/285 |
| 2022/0058714 | A1 * | 2/2022 | Chen | G06N 3/045 |

OTHER PUBLICATIONS

Gartner, “Master Data Management (MDM),” from https://www.gartner.com/it-glossary/master-data-management-mdm/, 2 pages, retrieved on Jan. 8, 2019.

“EU product classification system | Trade Helpdesk,” from https://trade.ec.europa.eu/tradehelp/eu-product-classification-system, 3 pages, retrieved on Jan. 8, 2019.

* cited by examiner

100A

| Manufacturer | Description | Price | Category | Subcategory |
| --- | --- | --- | --- | --- |
| ABC | Document Editing and Sharing Software | $59.99 | Computers | Software |
| XYZ | Digital Camera (24MP, 3in LCD Display) | $490.00 | Cameras | DSLR |

| Animal ID | Color | Description | Vertebrae | Blooded | Class |
|---|---|---|---|---|---|
| Animal 1 | Black and White | A Furry Dog | Yes | Warm | Mammal |
| Animal 2 | Green | A Long Snake | Yes | Cold | Reptile |
| Animal 3 | Black | A Scorpion with a Large Stinger | No | - | - |

MAINTAINING MASTER DATA USING HIERARCHICAL CLASSIFICATION

BACKGROUND

Various challenges exist related to the management of data and data processing. For example, as computing technology continues to process complex data having several parameters common across different data instances, data management and data maintenance may become a growing concern. To efficiently process data and reduce errors, the data should be organized in a uniform manner. This organization, however, is a cumbersome task especially when complex relationships exist between different sets of data having complex data attributes.

BRIEF DESCRIPTION OF THE DRAWINGS

The accompanying drawings are incorporated herein and form a part of the specification.

FIG. 1A depicts a block diagram of an example data table, according to some embodiments.

FIG. 1B depicts a block diagram of an example data table with transaction data, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 2:
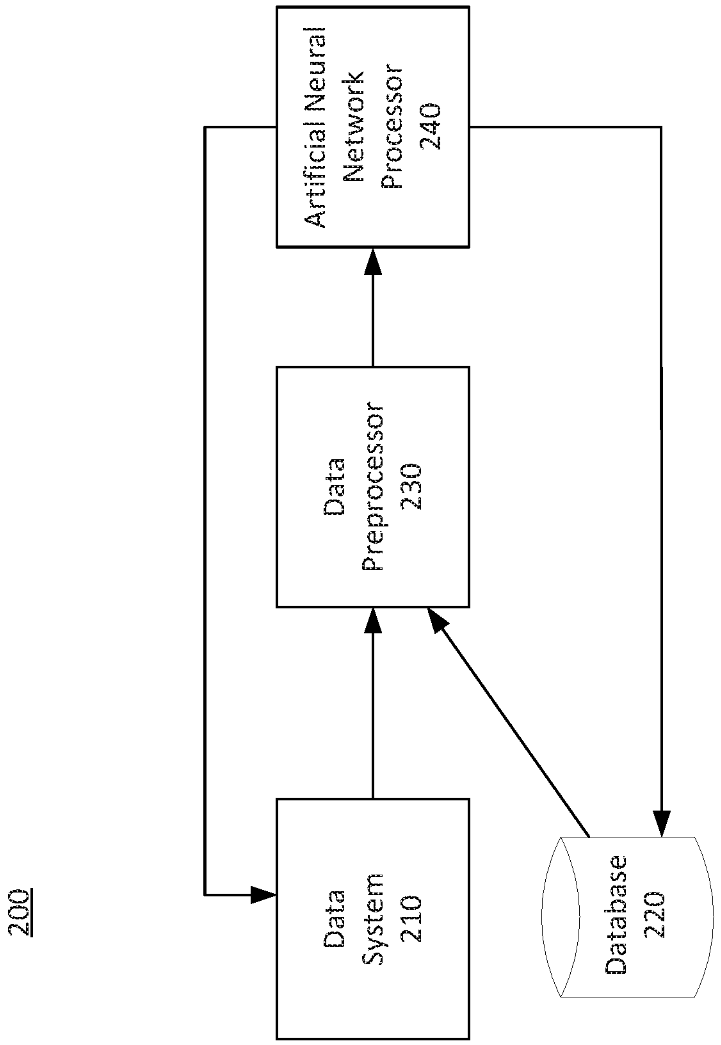
FIG. 2 depicts a block diagram of a hierarchical classification environment, according to some embodiments.

Provided herein are system, apparatus, device, method and/or computer program product embodiments, and/or combinations and sub-combinations thereof, for categorizing data having hierarchical categorical structures using machine learning.

In an embodiment, machine learning or artificial intelligence techniques may be applied to data to categorize the data. For example, an artificial neural network may be trained to identify a category and/or a subcategory corresponding to the data. The category and the subcategory may have a hierarchical relationship where the subcategory provides further detail related to the particular data or data objects. Training data sets may be used to train the artificial neural network to identify patterns and supply categories and/or subcategories to received data. This categorization may correlate data objects and/or data parameters related to those data objects to a particular category and/or subcategory using pattern recognition techniques. In an embodiment, the artificial neural network may be trained via supervised learning.

The embodiments described herein may provide data harmonization. The neural networks may categorize the data records in a uniform manner. Data that has been organized and/or categorized may more efficiently be processed in future applications such as data processing or data analytics. For example, this occurs when master data is harmonized prior to analyzing other transaction data. Properly identifying categories and/or subcategories or values for different levels of a hierarchy may allow subsequent processing to be performed in a faster and less computationally expensive manner. Further, the processing may occur with fewer errors and less wasteful processing.

As will be further explained below, the categorization process itself also provides increased flexibility and efficiency relative to other data categorization techniques. In particular, the embodiments described herein may classify data objects or instances having different attribute types and values, such as textual, numeric, and/or categorical values. This classification may support multiple languages for textual elements and/or symbolic elements. Further, the embodiments described herein may classify objects having varying structures, such as having more or fewer attribute categories. The embodiments may also classify data objects to an arbitrary hierarchy of classes and relationships between categories and subcategories. The embodiments described below are not restricted to hierarchies with only two levels or layers but also apply to hierarchies with any number of levels. Further, the embodiments may provide feedback related to prediction confidence. In this manner, the embodiments described herein may provide efficient hierarchical categorization of data objects.

Various embodiments of these features will now be discussed with respect to the corresponding figures.

FIG. 1A depicts a block diagram of a data table 100A, according to some embodiments. Data table 100A may represent data or records 102, 104 stored in a relational database. For example, data table 100A may store records directed to a product catalogue. Data table 100A may identify products and may list corresponding attributes related to the product. For example, data table 100A may list a manufacturer, description, price, category 106, and/or subcategory 108 as attributes of each record.

Data table 100A may include records 102, 104. Each record may be a data object or data instance that includes different values for corresponding attributes. For example, record 102 may include a manufacturer "ABC," a product description describing record 102 as "Document Editing and Sharing Software," a price value of "$59.99," a category 106 of "Computers," and a subcategory 108 of "Software." Similarly, record 104 may include different values for the corresponding attributes.

Category 106 may be an attribute corresponding to a record 102, 104 that classifies the record 102, 104 into a particular grouping. As an attribute, different values may occupy category 106. The values may be pre-programmed and may form a set of possible values that may be selected from and assigned to the category 106 attribute. For example, the values for category 106 may be "Computers," "Cameras," "Televisions," "Telephones," or other values. A value may be selected and assigned to category 106 for a particular record 102, 104.

Subcategory 108 may be a grouping that shares a hierarchical relationship with category 106. The selection of a particular value for category 106 may yield corresponding values that may be selected for subcategory 108. For example, the category 106 "Computers" may include different subcategory 108 values such as "Software," "RAM," "Peripherals," "Memory," or other subcategory 108 values related to "Computers." Using the combination of a category 106 and a subcategory 108 may allow a particular record 102, 104 to be classified in a hierarchical manner. For example, different records 102, 104 may share a common value for category 106 but may differ in subcategory 108. This classification may aid in data processing and/or data analysis of many records 102, 104 or large data tables 100A.

In an embodiment, data table 100A may represent training data used to train an artificial neural network or other machine learning or artificial intelligence algorithms to identify category 106 and subcategory 108 values for future records. To perform this training, certain attributes or variables from the records may be deemed "explanatory variables" while others may be deemed "explained variables." The explained variables may represent the predicted values for data records or the output of a machine learning model. The training of a machine learning model or neural network may include processing multiple training records 102, 104 to identify values for the explained variables based on patterns identified from the explanatory variables. For example, category 106 and subcategory 108 may be considered explained variables while the explanatory variables may be the manufacturer, description, and price information for a record. Based on the observed values for the explanatory variables, a machine learning model may be trained to predict category 106 and subcategory 108 values for future data records.

The machine learning model generated from the data may be a mathematical function relating explanatory variables and explained variables. These explanatory variables may be of different forms, such as numeric, categorical, and textual variables. The model may also identify semantics related to variables. The variables may also be formatted as floats, integers, or strings. In the example embodiment depicted in FIG. 1A, the manufacturer may be a categorical attribute, the price may be a numeric attribute, and the description may be a textual attribute.

As will be further described with reference to FIGS. 3A and 3B, an example machine learning technique may be an artificial neural network. The artificial neural network may include a latent representation layer followed by fully connected layers operating in parallel and corresponding to the number of explained variables. Each fully connected layer may use an activation function. The activation function may be, for example, a softmax function. The classes of each explanatory variable may be one-hot encoded.

When the set of explained variables is organized into a hierarchical structure, a loss function for each explanatory variable is weighted to more strongly penalize the model for errors that occur closer to the root of the hierarchy. For example, category 106 may be considered closer to the root of the hierarchy relative to subcategory 108 or potentially other subcategories stemming from subcategory 108. The weights for the loss function may be fixed and determined by the number of explained variables. The weights may be hyperparameters for the neural network and may be optimized or tuned for the particular relevant hierarchy similar to other hyperparameters such as the learning rate or batch size.

The values of an explanatory variable may be embedded into a high-dimensional Euclidean space and the mappings may be trained to minimize global loss. In this manner, the weighted average of all the individual losses may be minimized. A latent representation layer may include the concatenation of dense embeddings of the explanatory variables. For numeric variables, the mapping used may be an identity mapping. For categorical variables, the mapping may use a linear transformation defined by a weight matrix. For textual variables, words of the textual variable may be mapped into a Euclidean space. The centroid may then be used as a latent representation of the corresponding text. The concatenation of the embeddings of the different explanatory variables may provide a vector representation of a record in the data.

Using this structure, the artificial neural network may be trained to identify the values of the explained variables, such as category 106 and/or subcategory 108, based on the values of the explanatory variables of a particular record 102, 104. For example, after an artificial neural network has been trained to supply a particular value for category 106 and subcategory 108, the output from the neural network may be used to edit records 102, 104 to supply this information. In an embodiment, records 102, 104 may include values for the manufacturer, description, and price attributes but may have missing or erroneous values for category 106 and subcategory 108. The artificial neural network may be trained to supply this information by analyzing the values provided in the explanatory variables "Manufacturer," "Description," and "Price." An example embodiment of this analysis is described with reference to FIG. 3B.

In an embodiment, the artificial neural network may be trained in the manner described above to supply country codes or tariff codes. For example, in some countries, products or goods are classified into particular country codes for trade. When a new product is created, a company may assign a country code to that product while adhering to the regulations of the country. Some of this analysis, however, may be complex. For example, tariff codes may use a standardized product hierarchy with thousands of nodes. An example of this type of hierarchy is the European Union (EU) tariff code that includes the following components:

The Harmonized System (HS) is a 6-digit nomenclature organized in a hierarchical structure developed by the World Customs Organization (WCO).

The Combined Nomenclature (CN) is an 8-digit coding system, which comprise the HS codes with further EU subdivisions.

The Integrated Tariff (TARIC) is formed by the CN plus two additional digits (TARIC subheadings). TARIC provides information on trade policies and tariff measures applicable to specific goods in the EU.

By law, goods transported within the European Union must be assigned to a tariff code. Therefore, the assignment must be done correctly and in a timely manner. Moreover, tariff codes are subject to yearly revisions which adds additional difficulty in maintaining this categorical data. The machine learning embodiments described herein, however, are able to quickly analyze information related to the products and generate category 106 and subcategory 108 values to quickly supply this information. For example, the category 106 and subcategory 108 values may represent the particular subdivisions of the TARIC code.

FIG. 1B depicts a block diagram of a data table 100B with transaction data, according to some embodiments. For example, data table 100B may relate to transactions of different animals. Similar to data table 100A, data table 100B may include records 110, 112, 114. Each record 110, 112, 114 may include values for these variables. In an embodiment, the records 110, 112, 114 may correspond to different transactions. For example, each record 110, 112, 114, may correspond to a sale from a pet store. The attributes related to each transaction may include an "Animal ID" 116, "Color" 118, "Description" 120, "Vertebrae" 122, "Blooded" 124, and "Class" 126. The explanatory variables may include the "Color" 118, and "Description" 120 while the explained variables may be "Vertebrae" 122, "Blooded" 124, and "Class" 126.

The explained variables may include a category and subcategory relationship. For example, the category may be "Vertebrae" 122 with a Boolean value while "Blooded" 124 and "Class" 126 may be subcategories. As previously described with reference to FIG. 1A, an artificial neural network may be trained to identify the explained variables based on the explanatory variables of a particular transaction. For example, for record 110, the neural network may be trained to analyze the values corresponding to the color 118, and description 120 to determine a corresponding value for the vertebrae 122 category. The neural network may also identify subcategories blooded 124 and class 126 having a hierarchical relationship to the vertebrae 122 category. In an embodiment, the subcategories may also have a hierarchical relationship. For example, the selectable values for the class 126 subcategory may depend on the particular value of the blooded 124 category. The artificial neural network may supply values for the vertebrae 122 category as well as the blooded 124 and class 126 subcategories. In this manner, the artificial neural network may identify multiple subcategories.

In an embodiment, the neural network may also be trained or retrained to identify these multiple subcategories. The multiple subcategories may have a hierarchical relationship with the category or between themselves. Similarly, the neural network may be trained or retrained to identify multiple categories. These categories may be independent from each other with different subcategories. In an embodiment, the multiple categories may share common or overlapping subcategories.

While particular variables may be designated as explanatory and explained variables, the artificial neural network may also be modified to use different variables as explanatory or explained. For example, the color 118 attribute may be designated as a explained variable. In this case, the artificial neural network may supply a predicted value for the color 118 based on description 120. This flexibility allows the artificial neural network to consider different numbers of explanatory and explained variables with different data types. The designation of explanatory and explained variables may be specified in advance of training the artificial neural network.

Similarly, the machine learning embodiments described herein may provide data harmonization when data or records 110, 112, 114 are received from different sources. For example, a company may compile various product records from different distributors or companies. These records 110, 112, 114 may be incomplete, erroneous, and/or may be formatted in an inconsistent manner. For example, the vertebrae 122, blooded 124, and class 126 categories may be missing or erroneous. In an embodiment, the values may not correspond to the standardized values desired for the vertebrae 122, blooded 124, and class 126 categories in a particular data management or data maintenance system. In response to these different formats, the artificial neural network may provide data harmonization and map the values for the categories so that they follow standard category values. This type of data cleansing may allow for faster processing and analysis of the data due to the common hierarchical values used to classify the particular records 110, 112, 114.

FIG. 2 depicts a block diagram of a hierarchical classification environment 200, according to some embodiments. Hierarchical classification environment 200 may include data system 210, database 220, data preprocessor 230, and/or artificial neural network processor 240. These components may be used during the training of artificial neural network processor 240 and/or for classifying data records or data objects. These components may be implemented using one or more processors and/or memory, as well as hardware and/or software that may be configured to recognize characters of document, data in a data table, or data records.

During the training of artificial neural network processor 240, data system 210 and/or database 220 may supply training data. The training data may be data records or data objects having a desired mapping of explanatory variables to explained variables. Data system 210 may be a computing system sharing common hardware used to implement data preprocessor 230 and/or artificial neural network processor 240. Data system 210 may retrieve data from database 220 and/or supply the data to data preprocessor 230. In an embodiment, data preprocessor 230 may retrieve data from database 220.

In an embodiment, data system 210 may be a separate system from data preprocessor 230 and/or artificial neural network processor 240. For example, data system 210 may be an independent system supplying training data to artificial neural network processor 240 to provide training or supervised learning. In an embodiment, database 220 may supply training data to artificial neural network processor 240, and data system 210 may supply data that is to be classified or categorized by artificial neural network processor 240. Database 220 may be associated with the same system as artificial neural network processor 240.

After training artificial neural network processor 240 to identify hierarchical categories and/or subcategories, data system 210 and/or database 220 may supply data to be categorized. Artificial neural network processor 240 may apply the trained model to the received data to supply the corresponding categories and/or subcategories.

Prior to applying artificial neural network processor 240, the data may be applied to data preprocessor 230. Data preprocessor 230 may standardize data. For example, data preprocessor 230 may determine which parameters of the records correspond to which types of variables. For example, data preprocessor 230 may identify parameters as numeric, categorical, and/or textual. Data preprocessor 230 may also standardize data by converting text or number formatting to be uniform. For example, data preprocessor 230 may change the characters to be uniformly lower cased or capitalized. Similarly, data preprocessor 230 may standardize numeric values such as using a period or a comma as a decimal separator. Data preprocessor 230 may also perform statistical analyses on numeric data for standardization such as computing a mean and standard deviation. These processes may reduce noise related to the data and provide more standardization.

Data preprocessor 230 may be applied to training data and/or data to be classified. Data preprocessor 230 may be configured to perform the standardization in a desired manner. By applying data preprocessor 230 to training data, artificial neural network processor 240 may be trained using standardized data having a common formatting. By applying data preprocessor 230 prior to applying the artificial neural network processor 240, the classification of the data may be more accurately performed as the artificial neural network may be able to better process the standardized data with the reduction in data noise.

Upon applying artificial neural network processor 240 to data to be classified, artificial neural network processor 240 may supply a category and/or a subcategory for the data. Each data record or data object may be classified by artificial neural network processor 240. Upon supplying this categorization, artificial neural network processor 240 may transmit the classification to data system 210 and/or database 220. For example, if data system 210 is a system external to artificial neural network processor 240, artificial neural network processor 240 may transmit the categorization data to data system 210 via a communication protocol. If the data to be classified was supplied by database 220 or another memory device, artificial neural network processor 240 may supply the categorization data to database 220 or the memory device. In an embodiment, this process may include editing the data entries corresponding to the records stored in database 220 and/or the record stored in the memory device.

Figure 3A:
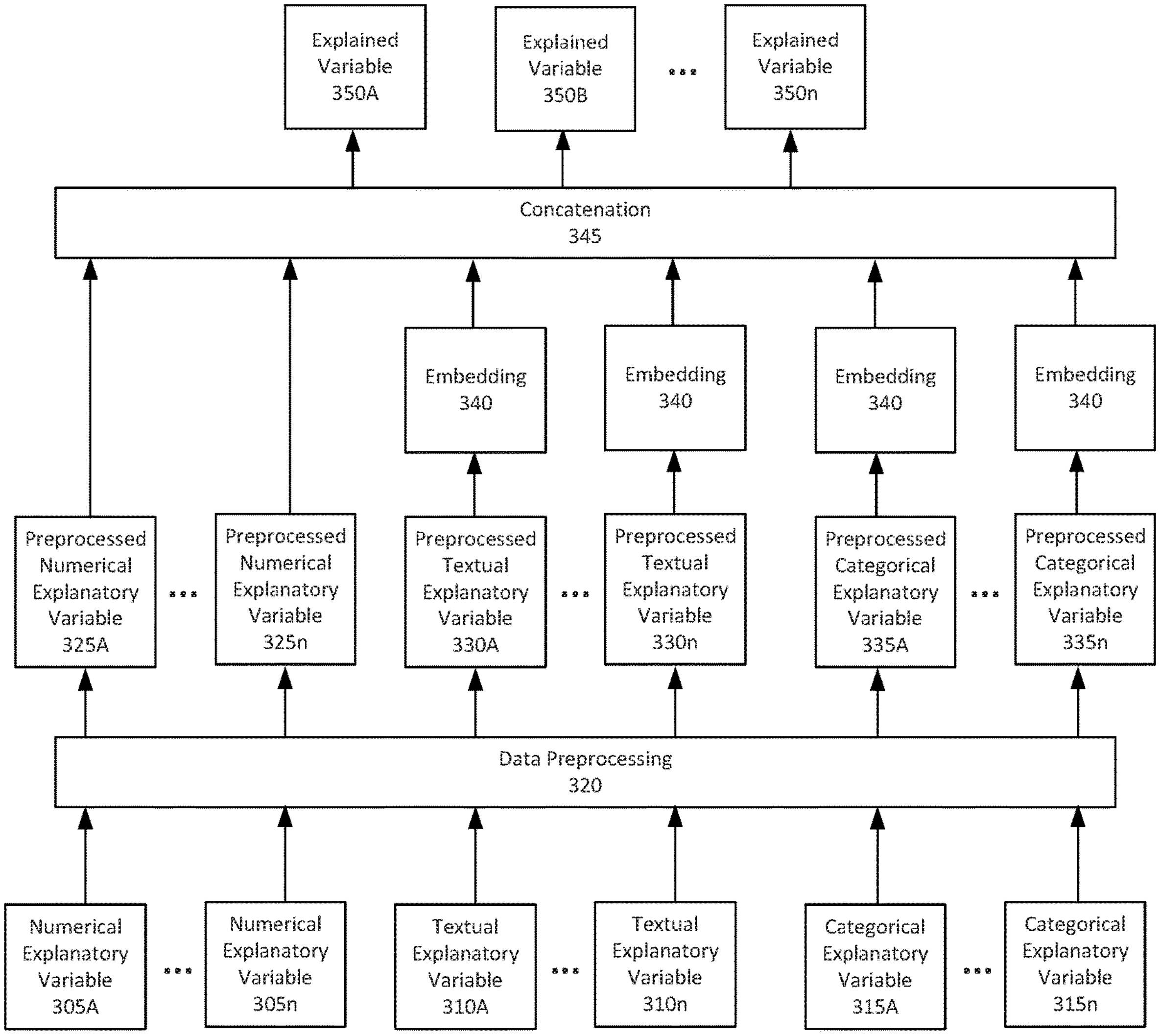
FIG. 3A depicts a block diagram of an example flow for detecting explained variables, according to some embodiments.

FIG. 3A depicts a block diagram of an example flow 300A for detecting explained variables 350, according to some embodiments. As previously described, a trained artificial neural network may predict explained variables based on the explanatory variables corresponding to a particular data record. The explanatory variables may include numerical explanatory variables 305, textual explanatory variables 310, and/or categorical explanatory variables 315. These explanatory variables may represent attribute values for a particular record. The artificial neural network may accept and analyze several different types of explanatory variables and/or quantities of explanatory variables.

In an embodiment, the explanatory variables may undergo data preprocessing 320. As previously described, data preprocessing 320 may include standardizing the values of the variables to allow for a more accurate analysis by the artificial neural network. After data preprocessing 320, the explanatory variables may be converted to preprocessed numerical explanatory variables 325, preprocessed textual explanatory variables 330, and/or preprocessed categorical explanatory variables 335. These variables may have standardized formatting. The preprocessed textual explanatory variables 330 and/or preprocessed categorical explanatory variables 335 may then undergo embedding 340.

Embedding 340 may be a layer in the artificial neural network configured to convert textual and/or categorical values into numerical values. For example, embedding 340 may include mapping the textual and/or categorical data to high-dimensional vectors that can be used by the model. The vectors may identify representations of the words and/or detect semantic information based on the distance between vectors. The preprocessed numerical explanatory variables 325 may already be in a format usable by the model so a separate embedding 340 process may not be required for the preprocessed numerical explanatory variables 325. The embedding 340 may convert the preprocessed textual explanatory variables 330 and/or preprocessed categorical explanatory variables 335 into a numerical vector representation compatible with the preprocessed numerical explanatory variables 325.

After conversion into vectors, the artificial neural network may perform concatenation 345. The model may then produce the explained variables 350 representing a hierarchical classification for the particular record. The artificial neural network may use fully connected layers corresponding to the number of explained variables. FIG. 3B provides an example embodiment illustrating the hierarchical classification as a category and a subcategory.

Figure 3B:
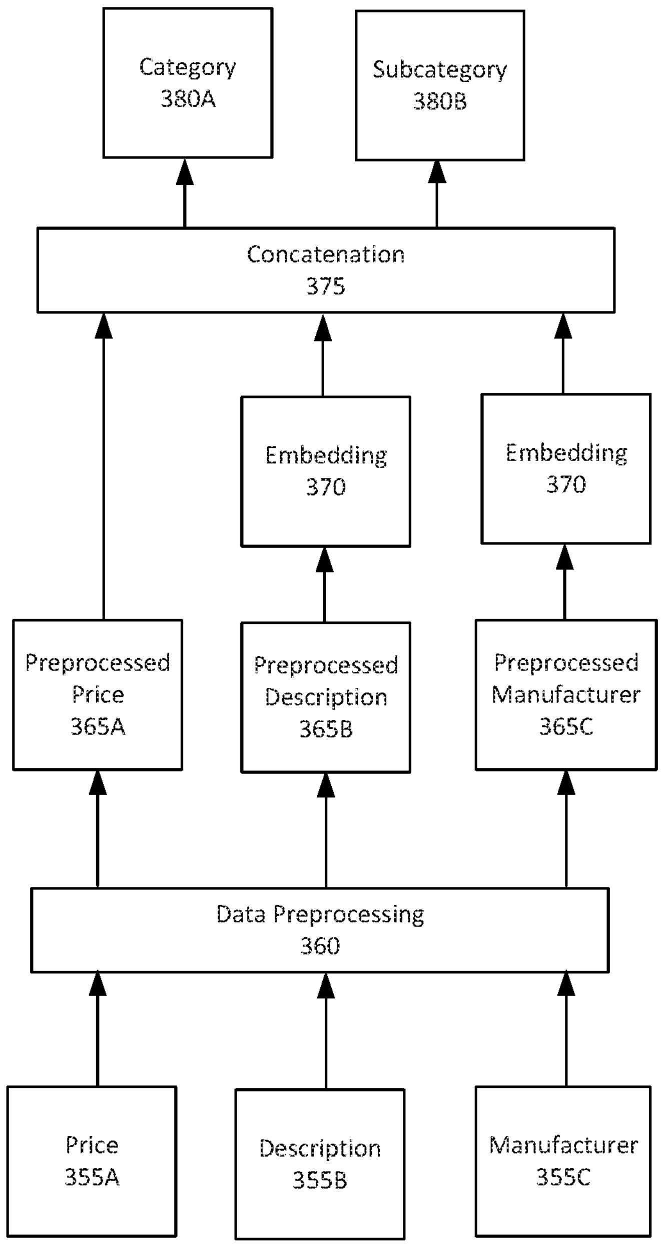
FIG. 3B depicts a block diagram of an example flow for detecting a category and a subcategory, according to some embodiments.

FIG. 3B depicts a block diagram of an example flow 300B for detecting a category 380A and a subcategory 380B, according to some embodiments. Similar to flow 300A described with respect to FIG. 3A, flow 300B illustrates the application of a trained neural network to detect explained variables from provided explanatory variables of a particular record. Flow 300B may be used to supply explained variables for data table 100A as described with respect to FIG. 1A. The explained variables may be category 380A and/or subcategory 380B. The explanatory variables may be values such as Price 355A, Description 355B, and Manufacturer 355C. Price 355A may be numerical variable, description 355B may be a textual variable, and manufacturer 355C may be categorical variable corresponding to a particular data record. For example, the data record may be record 102 or record 104 as described with respect to FIG. 1A.

Similar to flow 300A, the price 355A, description 355B, and manufacturer 355C data corresponding to a particular record may undergo data preprocessing 360. Data preprocessing 360 may format the variable data into a format expected by the artificial neural network. This formatting may have been used during the training of the neural network. Data preprocessing 360 may yield a preprocessed price 365A, preprocessed description 365B data, and/or preprocessed manufacturer 365C data.

The preprocessed description 365B data and/or the preprocessed manufacturer 365C data may undergo embedding 370. Embedding 370 may convert these values into numerical vectors that may be processed by the neural network. Following the embedding, the data may undergo concatenation 375 at a latent representation layer. The artificial neural network may then apply fully connected layers corresponding to the number of explained variables. Each fully connected layer may use an activation function. The activation function may be, for example, a softmax function. Upon applying the model and the fully connected layers, the artificial neural network may generate a corresponding category 380A and/or subcategory 380B.

Figure 4:
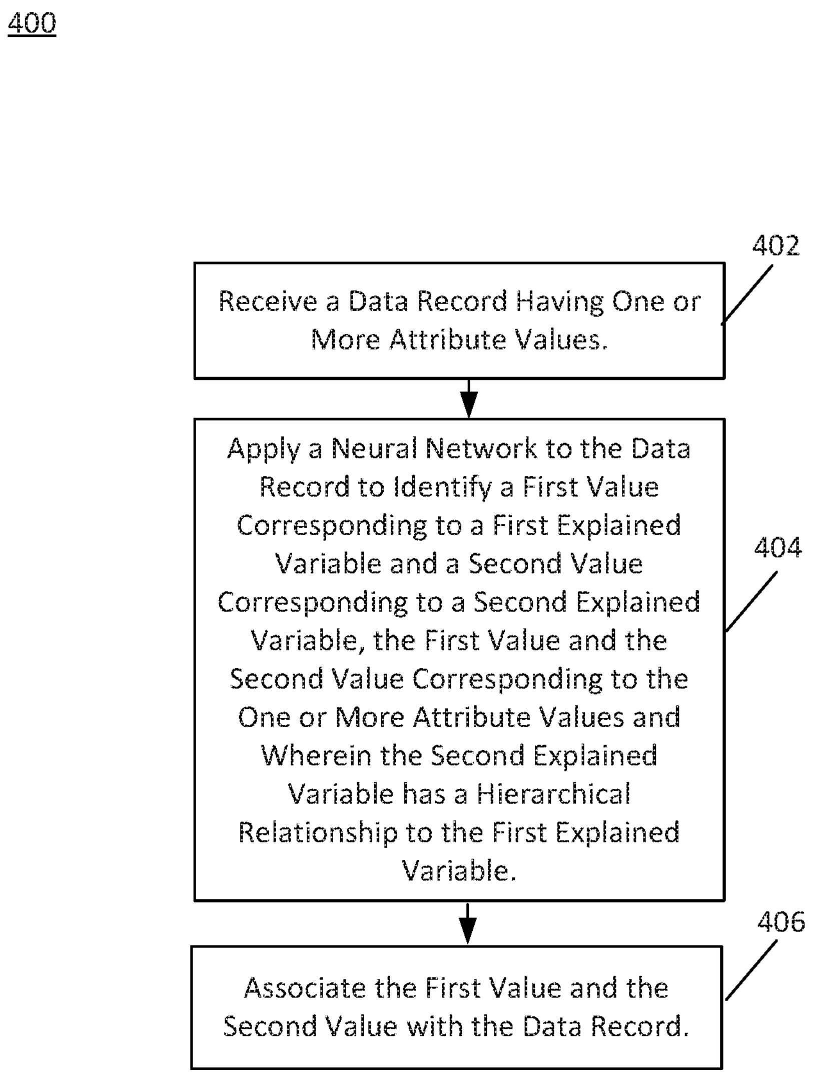
FIG. 4 depicts a flowchart illustrating a method for categorizing data, according to some embodiments.

FIG. 4 depicts a flowchart illustrating a method 400 for categorizing data, according to some embodiments. Method 400 shall be described with reference to FIG. 2; however, method 400 is not limited to that example embodiment.

In an embodiment, artificial neural network processor 240 may utilize method 400 to generate category and subcategory data corresponding to a data record or data object. The foregoing description will describe an embodiment of the execution of method 400 with respect to artificial neural network processor 240. While method 400 is described with reference to artificial neural network processor 240, method 400 may be executed on any computing device, such as, for example, the computer system described with reference to FIG. 5 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 4, as will be understood by a person of ordinary skill in the art.

At 402, artificial neural network processor 240 may receive a data record having one or more attribute values. Artificial neural network processor 240 may directly receive the data record from the data system 210 and/or database 220. In an embodiment, the data record may be received from data preprocessor 230. Data preprocessor 230 may have performed preprocessing and/or formatted the attribute values to be compatible with artificial neural network processor 240. The one or more attribute values may include explanatory variables used to identify the explained variables such as, for example, a category and/or subcategory. The one or more attribute values may also include explained variables. These may be altered or replaced by artificial neural network processor 240.

At 404, artificial neural network processor 240 may be applied to the data record to identify a first value corresponding to a first explained variable and a second value corresponding to a second explained variable, the first value and the second value corresponding to the one or more attribute values and wherein the second explained variable has a hierarchical relationship to the first explained variable. In an embodiment, the first explained variable may correspond to a particular category while the second explained variable may correspond to a particular subcategory of the category. As previously explained, the choice of a particular category may limit the values for the subcategory. The artificial neural network processor 240 may apply one or more embedding layers, concatenation at a latent representation layer, and a number of fully connected layers corresponding to the number of explained variables. For example, the explained variables may be the category and the subcategory corresponding to the particular data record.

While a first and a second explained variable are described at 404, artificial neural network processor 240 may identify more or other explained variables. For example, values for other explained variables may be identified where the other explained variables also follow the hierarchy of the first explained variable and the second explained variable. For example, the other explained variables may be other categories and/or subcategories.

At 406, the artificial neural network processor 240 may associate the category and the subcategory with the data record. For example, artificial neural network processor 240 may transmit the first explained variable value and/or the second explained variable value to data system 210. Data system 210 may share common hardware and/or software with artificial neural network processor 240. Data system 210 may then perform data processing or analytics using the first and second explained variable values. In an embodiment, artificial neural network processor 240 may transmit the first explained variable value and/or the second explained variable value to database 220. Artificial neural network processor 240 may edit the record stored in database 220 to reflect the determined category and/or subcategory. This updating may replace missing and/or erroneous category and/or subcategory data corresponding to the record stored in database 220.

Figure 5:
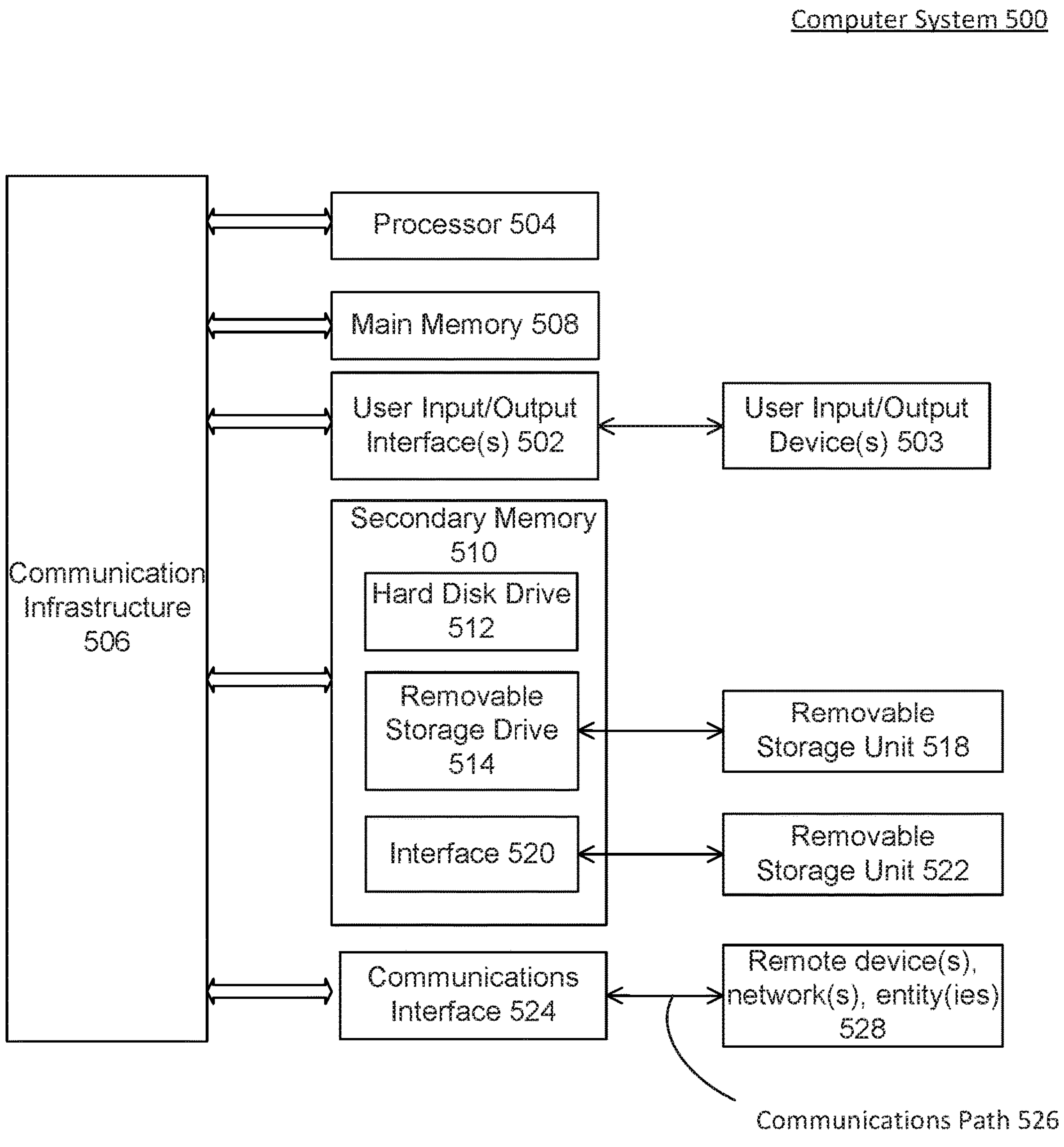
FIG. 5 depicts an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc. The parallel structure may also train neural networks more efficiently.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:

receiving a data record, from a data system, having one or more attribute values;

applying a neural network to the data record to identify a first value corresponding to a first explained variable and a second value corresponding to a second explained variable, the first value and the second value corresponding to the one or more attribute values, wherein the second explained variable depends on the first explained variable in a hierarchy, and wherein a loss function of the neural network more strongly penalizes an error in identifying the first value corresponding to the first explained variable than an error in identifying the second value corresponding to the second explained variable;

updating the data record by replacing a first attribute value of the data record with the first value and replacing a second attribute value of the data record with the second value;

storing the updated data record in a database that is accessible to the data system;

and performing, by the data system, data processing or data analytics using the updated record.

2. The computer implemented method of claim 1, wherein the applying further comprises:

applying data preprocessing to the data record to standardize a format of the one or more attribute values.

3. The computer implemented method of claim 1, wherein the applying further comprises:

embedding textual attribute values of the one or more attribute values to generate one or more vectors corresponding to the textual attribute values; and concatenating the one or more vectors with numerical attribute values of the one or more attribute values.

4. The computer implemented method of claim 3, wherein the applying further comprises:

embedding categorical attribute values of the one or more attribute values to generate one or more vectors corresponding to the categorical attribute values; and concatenating the one or more vectors corresponding to the categorical attribute values with the numerical attribute values and the one or more vectors corresponding to the textual attribute values.

5. The computer implemented method of claim 1, wherein the applying further comprises:

applying a first fully connected layer to identify the first value corresponding to the first explained variable; and applying a second fully connected layer to identify the second value corresponding to the second explained variable.

6. The computer implemented method of claim 1, wherein the first explained variable is a category and the second explained variable is a subcategory of the category.

7. A system, comprising:

a memory; and at least one processor coupled to the memory and configured to:

receive a data record, from a data system, having one or more attribute values;

apply a neural network to the data record to identify a first value corresponding to a first explained variable and a second value corresponding to a second explained variable, the first value and the second value corresponding to the one or more attribute values, wherein the second explained variable depends on the first explained variable in a hierarchy, and wherein a loss function of the neural network more strongly penalizes an error in identifying the first value corresponding to the first explained variable than an error in identifying the second value corresponding to the second explained variable;

update the data record by replacing a first attribute value of the data record with the first value and replacing a second attribute value of the data record with the second value;

store the updated data record in a database that is accessible to the data system;

and perform, by the data system, data processing or data analytics using the updated record.

8. The system of claim 7, wherein to apply the neural network, the at least one processor is further configured to:

apply data preprocessing to the data record to standardize a format of the one or more attribute values.

9. The system of claim 7, wherein to apply the neural network, the at least one processor is further configured to:

embed textual attribute values of the one or more attribute values to generate one or more vectors corresponding to the textual attribute values; and concatenate the one or more vectors with numerical attribute values of the one or more attribute values.

10. The system of claim 9, wherein to apply the neural network, the at least one processor is further configured to:

embed categorical attribute values of the one or more attribute values to generate one or more vectors corresponding to the categorical attribute values; and concatenate the one or more vectors corresponding to the categorical attribute values with the numerical attribute values and the one or more vectors corresponding to the textual attribute values.

11. The system of claim 7, wherein to apply the neural network, the at least one processor is further configured to:

apply a first fully connected layer to identify the first value corresponding to the first explained variable; and apply a second fully connected layer to identify the second value corresponding to the second explained variable.

12. The system of claim 7, wherein the first explained variable is a category and the second explained variable is a subcategory of the category.

13. A non-transitory computer-readable device having instructions stored thereon that, when executed by at least one computing device, cause the at least one computing device to perform operations comprising:

receiving a data record, from a data system, having one or more attribute values;

applying a neural network to the data record to identify a first value corresponding to a first explained variable and a second value corresponding to a second explained variable, the first value and the second value corresponding to the one or more attribute values, wherein the second explained variable depends on the first explained variable in a hierarchy, and wherein a loss function of the neural network more strongly penalizes an error in identifying the first value corresponding to the first explained variable than an error in identifying the second value corresponding to the second explained variable;

updating the data record by replacing a first attribute value of the data record with the first value and replacing a second attribute value of the data record with the second value;

storing the updated data record in a database that is accessible to the data system;

and performing, by the data system, data processing or data analytics using the updated record.

14. The non-transitory computer-readable device of claim 13, wherein the applying comprises:

applying data preprocessing to the data record to standardize a format of the one or more attribute values.

15. The non-transitory computer-readable device of claim 13, wherein the applying comprises:

embedding textual attribute values of the one or more attribute values to generate one or more vectors corresponding to the textual attribute values;

embedding categorical attribute values of the one or more attribute values to generate one or more vectors corresponding to the categorical attribute values; and concatenating the one or more vectors corresponding to the categorical attribute values with the numerical attribute values and the one or more vectors corresponding to the textual attribute values.

16. The non-transitory computer-readable device of claim 13, wherein the applying comprises:

applying a first fully connected layer to identify the first value corresponding to the first explained variable; and applying a second fully connected layer to identify the second value corresponding to the second explained variable.

17. The non-transitory computer-readable device of claim 13, wherein the first explained variable is a category and the second explained variable is a subcategory of the category.

18. The computer implemented method of claim 1, wherein replacing the first attribute value of the data record with the first value comprises one of:

replacing a missing attribute value with the first value; or replacing an erroneous attribute value with the first value.

19. The system of claim 7, wherein to update the data record by replacing the first attribute value of the data record with the first value, the at least one processor is configured to:

replace a missing attribute value with the first value; or replace an erroneous attribute value with the first value.

20. The non-transitory computer-readable device of claim 13, wherein replacing the first attribute value of the data record with the first value comprises one of:

replacing a missing attribute value with the first value; or replacing an erroneous attribute value with the first value.

* * * * *